United States Patent [19]
Mohri et al.

[11] Patent Number: 5,169,915
[45] Date of Patent: Dec. 8, 1992

[54] FLUORINE-CONTAINING COPOLYMER AND CURABLE COMPOSITION CONTAINING THE SAME

[75] Inventors: Haruhiko Mohri; Yoshiki Shimizu; Hideya Saito; Akira Chida, all of Settsu, Japan

[73] Assignee: Daikin Industries, Ltd., Osaka, Japan

[21] Appl. No.: 723,073

[22] Filed: Jun. 28, 1991

[30] Foreign Application Priority Data

Jun. 29, 1990 [JP] Japan ................................. 2-172906
Jun. 24, 1991 [JP] Japan ................................. 3-151562

[51] Int. Cl.$^5$ ........................ C08F 12/20; C08F 14/18
[52] U.S. Cl. .................................. 526/247; 526/249; 526/254; 526/255
[58] Field of Search ................. 526/249, 255, 247, 254

[56] References Cited

U.S. PATENT DOCUMENTS

| | | | |
|---|---|---|---|
| 3,380,971 | 4/1968 | Chalmers et al. | 526/255 |
| 3,380,974 | 4/1968 | Stilmar | 526/254 |
| 3,445,434 | 5/1969 | Stilmar . | |
| 3,579,474 | 5/1971 | Ro . | |
| 3,859,259 | 1/1975 | Harrell et al. | 526/255 |
| 4,701,508 | 10/1987 | Homma et al. | 526/255 |
| 4,751,114 | 6/1988 | Homma et al. | 526/253 |

FOREIGN PATENT DOCUMENTS

| | | | |
|---|---|---|---|
| 0111342 | 6/1984 | European Pat. Off. | 526/255 |
| 47-39954 | 10/1972 | Japan | 526/255 |
| 840735 | 7/1960 | United Kingdom | 526/255 |
| 1024351 | 3/1966 | United Kingdom | 526/255 |
| 2081727 | 2/1982 | United Kingdom | 526/255 |

OTHER PUBLICATIONS

"Emulsion Polymerization of Tetrafluoroethylene and Isobutylene" by Coker, Jour. of Polymer Science No. 11 vol. 13, 2473-2489 Nov. 1975.

*Primary Examiner*—Joseph L. Schofer
*Assistant Examiner*—Sarofim N.
*Attorney, Agent, or Firm*—Armstrong & Kubovcik

[57] ABSTRACT

A fluorine-containing copolymer comprising 20 to 60% by mole of the fluoroolefin unit (1), 5 to 45% by mole of the β-methyl substituted α-olefin unit (2), 1 to 45% by mole of the unit (3) derived from a monomer having a chemically curable functional group, 1 to 45% by mole of the unit (4) derived from a monomer having ester moieties in the side chains and 0 to 45% by mole of the unit (5) derived from a copolymerizable monomer other than the above monomers, if necessary, 0.1 to 15% by mole of the unit (6) derived from a monomer having carboxyl groups. The copolymer can provide a curable composition alone or with an acrylic polymer. The fluorine-containing copolymer is excellent in solvent-solubility, compatibility with curing agents, additives and other polymers, pigment dispersibility, curing reactivity, dispersibility to water, pot life, film forming ability, coating properties, and the like. The coating film prepared from the copolymer has a high weatherability and is excellent in film properties such as stain resistance, heat-yellowing resistance, dechlorination resistance, optical properties, adhesion to a substrate, mechanical properties, heat resistance, chemical resistance, solvent (gasoline) resistance, water resistance and good appearance of finished products.

4 Claims, No Drawings

FLUORINE-CONTAINING COPOLYMER AND CURABLE COMPOSITION CONTAINING THE SAME

BACKGROUND OF THE INVENTION

The present invention relates to a fluorine-containing copolymer which is capable of chemical curing, and a curable composition containing the copolymer.

A copolymer of a fluoroolefin and ethylene has generally excellent properties such as weatherability, heat resistance and chemical resistance, and is applied to various uses. The copolymer is, however, poor in solubility to usual organic solvents. When being soluble, kinds and conditions of usable solvents are severely restricted. Further, since the copolymer has a high crystallinity, there are problems in optical properties such as glossiness and transparency. A copolymer is prepared by employing isobutylene instead of ethylene and incorporating a copolymerizable monomer (Japanese Examined Patent Publication No. 16152/1968). Though the copolymer is relatively soluble in usual organic solvents and is excellent in weatherability, the kinds of usable solvents are not yet enough. In addition, the copolymer does not have a reactive functional group, and thus cannot be cured by chemical reaction.

Recently, researchers have studied fluorocarbon resin paints which are curable at room temperature without baking at an elevated temperature. For example, Japanese Examined Patent Publication No. 21686/1985 discloses that a fluorine-containing copolymer prepared by copolymerizing a fluoroolefin, vinyl ethers and a hydroxyalkyl vinyl ether is useful as a curable paint at room temperature having weatherability. However, since the copolymer contains various vinyl monomers at an amount of approximately 50% by mole as a monomer unit, there are problems in weatherability and also in stain resistance.

As described above, the conventional fluorine-containing copolymers have both merits and demerits. As a result of the present inventors' intensive study for obtaining a polymer which is usable for a curable fluorocarbon resin paint with a usual solvent and can give a coating film being excellent in various properties such as weatherability, stain resistance, heat-yellowing resistance and optical properties, the inventors have found the fact that the above objects can be accomplished by using a fluorine containing copolymer prepared by polymerizing the fluoroolefins, the β-methyl substituted α-olefin, the monomers having a chemically curable functional group and the monomers having an ester moiety in the side chains, if necessary, a monomer having carboxyl groups and/or the other copolymerizable monomers, and then the present invention has been completed.

SUMMARY OF THE INVENTION

According to the present invention, there can be provide a fluorine-containing copolymer comprising the following structural units in the particular amounts;
(1) a fluoroolefin structural unit (1) represented by the formula (I):

$$-CF_2-CFX-  \quad (I)$$

wherein X is fluorine atom, chlorine atom, hydrogen atom or trifluoromethyl;

(2) a β-methyl substituted α-olefin structural unit (2) represented by the formula (II):

wherein R is an alkyl group having 1 to 8 carbon atoms;
(3) a structural unit (3) derived from a monomer having a chemically curable functional group;
(4) a structural unit (4) derived from a monomer having an ester moieties in the side chain; and
(5) a structural unit (5) derived from a copolymerizable monomer other than the above monomers, and when the unit (1) is the unit (1a) derived from derived from tetrafluoroethylene, further containing a structural unit (6) derived from a monomer having carboxyl groups. The present invention can also provide a curable composition containing the copolymer.

The fluorine-containing copolymer of the present invention comprising the particular structural units is excellent in solvent-solubility, compatibility with curing agents, additives and other polymers, pigment despersibility, curing reactivity, dispersibility to water, pot life, film forming ability, coating properties, and the like. The coating film prepared from the copolymer has a high weatherability and is excellent in film properties such as stain resistance, heat-yellowing resistance, dechlorination resistance, optical properties, adhesion to a substrate, mechanical properties, heat resistance, chemical resistance, solvent (gasoline) resistance, water resistance and appearance of finished products.

Monomers which give the structural unit (1) in the fluorine-containing copolymer of the present invention are tetrafluoroethylene, chlorotrifluoroethylene, trifluoroethylene and hexafluoropropylene. The content of the unit (1) is 20 to 60% (% by mole, hereinafter the same otherwise noted). When the content is less than 20%, the weatherability and stain resistance are lowered, and when more than 60%, the solvent solubility is lowered.

Monomers which give the structural unit (2) are, for example, isobutylene, 2-methyl-1-butene, 2-methyl-1-pentene, 2-methyl-1-hexene and the like. The content of the unit (2) is 5 to 45%. When the content is less than 5%, the weatherability is lowered, and when more than 45%, the preparation of the copolymer becomes difficult. If ethylene is used instead of the unit (2), the solubility of the copolymer to solvents is lowered. Also, if vinyl chloride is used instead of the unit (2), the heat-yellowing resistance of the copolymer and the pot life of the solution containing the copolymer are remarkably lowered.

The sum content of the units (1) and (2) must be 40 to 90%. When less than 40%, the weatherability, stain resistance, heat-yellowing resistance and chemical resistance are lowered, while when more than 90%, the optical properties and solubility are lowered. The preferably range is 50 to 85%.

The structural unit (3) is derived from a monomer having a chemically curable functional group such as hydroxyl, epoxy or silyl. Examples of the monomer are, for instance, a hydroxyalkyl vinyl ether or hydroxyalkyl allyl ether represented by the formula (IIIa):

$$CH_2=CHR^1 \quad (IIIa)$$

wherein $R^1$ is $-OR^2$ or $-CH_2OR^2$ in which $R^2$ is an alkyl group having a hydroxyl group. The preferred substituent $R^2$ is a linear or branched alkyl group of 1 to 8 carbon atoms to which 1 to 3, preparably one, hydroxyl groups are bonded. Examples of the monomer are, for instance, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether, and the like.

Other than the above-mentioned monomers, the unit (3) can be obtained from the epoxy group-containing vinyl monomers described in Japanese Unexamined Patent Publication No. 232250/1990 and No. 232251/1990, or the silyl group-containing vinyl monomers described in Japanese Unexamined Patent Publication No. 141713/1986.

As the epoxy group-containing vinyl monomers, there are, for example, epoxyvinyls and epoxy vinyl ethers represented by the formula (IIIb):

wherein $R^3$ is $-CH_2-O-R^5-$,

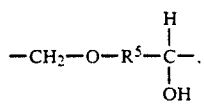

$-O-R^5-$ or $-R^5-$ in which $R^5$ is an alkylene group, and $R^4$ is

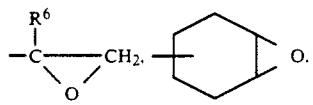

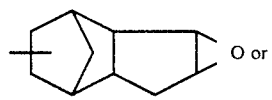

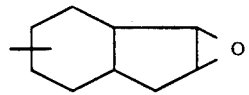

in which $R^6$ is hydrogen atom or an alkyl group. Examples of the monomer are, for instance,

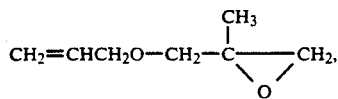

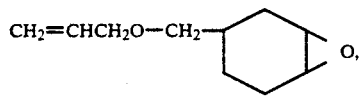

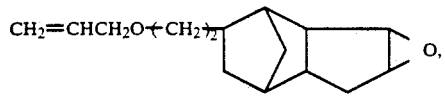

-continued

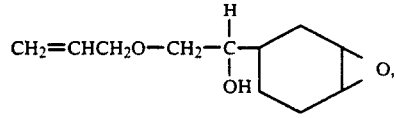

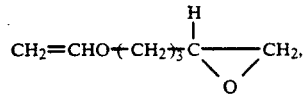

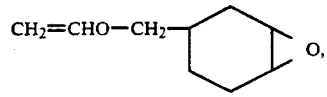

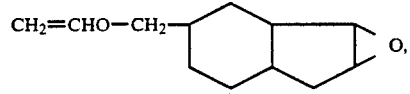

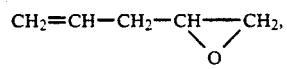

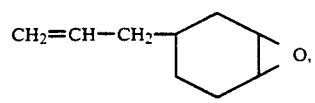

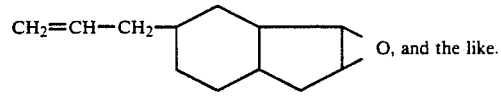

Examples of the silyl group-containing vinyl monomer are, for instance, vinyltrimethoxysilane, vinyltriethoxysilane, vinyltripropoxysilane, vinylmethyldimethoxysilane, vinyldimethylmethoxysilane, vinylmethyldiethoxysilane, vinyltris($\beta$-methoxyethoxy)silane, trimethoxysilylethyl vinyl ether, triethoxysilylethyl vinyl trimethoxysilylbutyl vinyl ether, methyldimethoxysililethyl vinyl ether, trimethoxysilylpropyl vinyl ether, ether, triethoxysilylpropyl vinyl ether, vinyltriisopropenyloxysilane, vinylmethyldiisopropenyloxysilane, triisopropenyloxysilylethyl vinyl ether, triisopropenyloxysilylpropyl vinyl ether, triisopropenyloxysilylbutyl vinyl ether, vinyltris(dimethyliminoxy)silane, vinyltris(methylethyliminoxy)silane, vinyltris(methylethyliminoxy)silane, vinylmethylbis(dimethyliminoxy)silane, vinyldimethyl(dimethyliminoxy)silane, tris(dimethyliminoxy)silylethyl vinyl ether, methylbis(dimethyliminoxy)silylethyl vinyl ether, tris(-dimethyliminoxy)silylbutyl vinyl ether, $\gamma$-(meth)acryloyloxypropyltrimethoxysilane, $\gamma$-(meth)acryloyloxypropyltriethoxysilane, $\gamma$-(meth)acryloyloxypropylmethyldimethoxysilane, $\gamma$-(meth)acryloyloxypropyltriisopropenyloxysilane, $\gamma$-(meth)acryloyloxypropyltris($\beta$-methoxyethoxy)silane, $\gamma$-(meth)acryloyloxypropyltris(dimethyliminoxy)silane, allyltrimethoxysilane, and the like.

The content of the unit (3) is 1 to 45%, preferably 1 to 30%, most preferably 5 to 15%. When less than 1%, the curing property is insufficient, while when more than 45%, the pot life is lowered because of easiness of gellation, and further the obtained coating film becomes brittle.

Monomers having ester moieties in the side chains which give the unit (4) are, for example, a monomer represented by the formula (IV):

$$CHR^7=CHR^8 \tag{IV}$$

wherein, $R^7$ is hydrogen atom or $-COOR^9$, $R^8$ is $-COOR^9$ or $-OCOR^9$, in which $R^9$ is an alkyl group, a cycloalkyl group, a fluoroalkyl group, an arylalkyl group or an phenyl group which may be substituted by an alkyl group; provided that when $R^8$ is $-OCOR^9$, $R^7$ is hydrogen atom. Preferred examples of the monomer are, for instance, a vinyl carboxylate represented by the formula (IVa):

$$CH_2=CH(OCOR^9) \tag{IVa}$$

and a diester of maleic acid or fumaric acid represented by the formula (IVb):

$$(R^9OOC)CH=CH(COOR^9) \tag{IVb}$$

wherein $R^9$ is as defined above. Examples of the substituent $R^9$ are an alkyl group of 1 to 10 carbon atoms, a cycloalkyl group of 3 to 10 carbon atoms, a fluoroalkyl group of 1 to 10 carbon atoms, an arylalkyl group of 1 to 10 carbon atoms, and a phenyl group which may be substituted by an alkyl group of 1 to 8 carbon atoms.

Example of the vinyl carboxylate of the formula (IVa) are, for instance, vinyl acetate, vinyl propionate, vinyl butyrate, vinyl isobutyrate, vinyl pivalate, vinyl caproate, vinyl Versatate ®, vinyl laurate, vinyl stearate, vinyl benzoate, vinyl p-tert-butylbenzoate, vinyl salicylate, vinyl cyclohexanecarboxylate, vinyl hexafluoropropionate, vinyl trichloroacetate, and the like. Examples of the diester of the dicarboxylic acid of the formula (IVb) are, for instance, dimethyl, diethyl, dipropyl, dibutyl, diphenyl, dibenzyl, ditrityl, ditrifluoromethyl, ditrifluoroethyl or dihexafluoropropyl esters of maleic acid or fumaric acid.

The content of the unit (4) is 1 to 45%, preferably 5 to 40%, most preferably 10 to 30%. When less than 1%, the solubility and compatibility becomes poor and the glass transition temperature becomes low. When more than 45%, the weatherability is lowered. The unit (4) endows the copolymer with the improved compatibility, glass transition temperature and pigment dispersibility, and also endows the prepared coating film with the improved glossiness, stain resistance, hardness and adhesion to a substrate.

In addition to the units (1), (2), (3) and (4), the unit (5) derived from a copolymerizable monomer other than the above monomers may be incorporated in an amount of not more than 45%, preferably 1 to 15% in order to endow the copolymer with various properties of the other copolymerizable monomers without impairing the characteristic properties of the fluorine-containing copolymer. Typical examples of the other monomers are, for instance, alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, 2-ethylhexyl vinyl ether, 2-acetoxyethyl vinyl ether and 2-chloroethyl vinyl ether; cycloalkyl vinyl ethers such as cyclopentyl vinyl ether, cyclohexyl vinyl ether, methylcyclohexyl vinyl ether and cyclooctyl vinyl ether; aromatic vinyl ethers such as benzyl vinyl ether, phenetyl vinyl ether, phenyl vinyl ether, 2-phenoxyethyl vinyl ether and 2-vinyloxyethyl benzoate; fluoroalkyl vinyl ethers such as 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-octafluoropentyl vinyl ether, 2,2,3,3,4,4,5,5,6,6,7,7,8,8,9,9-hexadecafluorononyl vinyl ether, perfluoromethyl vinyl ether, perfluoroethyl vinyl ether and perfluoropropyl vinyl ether; fluoroalkylethylene of the formula:

$$CH_2=CH(CF_2)_iCF_3 (i=0\text{-}10)$$

and the like.

Further, there may be copolymerized $C_{1-18}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, trityl methacrylate and lauryl methacrylate; $C_{2-18}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; vinyl aromatic compounds such as styrene α-methylstyrene, vinyltoluene and p-chlorostyrene.

According to the present invention, when the structural unit (1) is the unit (1a) derived from tetrafluoroethylene, the structural unit (6) derived from a monomer having a carboxyl group may be incorporated in addition to the units (1) to (5).

Monomers having a carboxyl group which give the unit (6) are, for example, carboxyl group-containing vinyl monomers represented by the formula (Va):

$$\begin{array}{cc} R^{10} & R^{12} \\ | & | \\ C = C \\ | & | \\ R^{11} & (CH_2)_nCOOH \end{array} \tag{Va}$$

wherein $R^{10}$, $R^{11}$ and $R^{12}$ are same or different, and each is hydrogen atom, an alkyl group, phenyl, carboxyl or an ester group, and n is 0 or 1; or represented by the formula (Vb):

$$CH_2=CH(CH_2)_nO(R^{13}OCO)_mR^{14}COOH \tag{Vb}$$

wherein $R^{13}$ and $R^{14}$ are same or different, and each is a linear or cyclic alkyl which may be saturated or unsaturated, n is 0 or 1, and m is 0 or 1. Examples of the monomer are, for instance, acrylic acid, methacrylic acid, vinylacetic acid, crotonic acid, cinnamic acid, 3-allyloxypropionic acid, itaconic acid, monoester of itaconic acid, maleic acid, monoester of maleic acid, maleic acid anhydride, fumaric acid, monoester of fumaric acid, vinylphthalic acid, phthalic acid monovinyl ester, vinyl pyromellitate, pyromellitic acid monovinyl ester, and the like.

The structural unit (6) can improve the properties of the copolymer in dispersibility to water, curing reactivity and pigment dispersibility into the copolymer solution, and the obtained coating film is improved in glossiness, hardness and adhesion to a substrate.

In this case, the molar ratio of the units (1a)/(2)/(3)/(4)/(5)/(6) is preferably 30-60/5-45/1-45/1-45/0-45/0.1-15, provided that the sum of (1) and (2) is 40 to 60%. When the content of the unit (6) is less than 0.1%, the above properties are lowered, while more than 15%, the pot life sometimes becomes lowered.

Each of the structural units (1) to (6) may be used alone or in an admixture of more than two kinds.

The fluorine-containing copolymer of the present invention comprising those structural units has a number average molecular weight, measured by gel permeation chromatography (GPC) in which tetrahydrofuran is used as an eluent, of 1,000 to 500,000, preferably 3,000 to 100,000, and has a glass transition temperature, measured by differential scanning calorimeter (DSC), of $-40°$ C. to $90°$ C., preferably $-10°$ to $70°$ C. When the molecular weight is too small, the hardness of the coating film becomes insufficient, while when too large, a coating solution is hard to handle because of high viscosity of the copolymer solution.

The copolymerization is conducted in, usually, emulsion polymerization, suspension polymerization or solution polymerization. The polymerization temperature is, in any of the above-mentioned polymerization methods, usually from $0°$ to $150°$ C., preferably from $5°$ to $95°$ C. The polymerization pressure is, in any of the above-mentioned polymerization methods, usually 1 to 100 kg/cm$^2$G.

As the solvent used in emulsion polymerization, water is used. Examples of the solvents used in suspension polymerization are, for instance, water, tert-butyl alcohol, 1,1,2-trichloro-1,2,2-trifluoroethane, 1,2-dichloro-1,1,2,2-tetrafluoroethane, a mixture thereof, and the like. Examples of the solvents used in solution polymerization are, for instance, esters such as methyl acetate, ethyl acetate, propyl acetate and butyl acetate; ketones such as acetone and methyl ethyl ketone and cyclohexanone; hydrocarbons such as hexane, cyclohexane and octane; aromatic hydrocarbons such as benzene, toluene, xylene and naphthalene; alcohols such as methyl alcohol, ethyl alcohol, tert-butyl alcohol, isopropyl alcohol and ethylenglycol monoalkyl ether; cyclic ethers such as tetrahydrofuran, tetrahydropyran and dioxane; dimethylsulphoxide; and a mixture thereof.

As the polymerization initiator, there can be used, for example, persulfates such as ammonium persulfate and potassium persulfate (reducing agents such as sodium hydrogen sulfite, sodium pyrosulfite, cobalt naphthenate and dimethylaniline can be used together, if ocasion demands); redox initiators comprising an oxidizing agent such as ammonium peroxide or potassium peroxide, a reducing agent such as sodium sulfite, and a transition methal such as ferrous sulfate; diacyl peroxides such as acetyl peroxide and benzoyl peroxide; dialkoxycarbonyl peroxides such as isopropoxycarbonyl peroxide and tertbutoxycarbonyl peroxide; ketone peroxides such as methyl ethyl ketone peroxide and cyclohexanone peroxide; hydroperoxides such as hydrogen peroxide, tert-butyl hydroperoxide and cumene hydroperoxide; dialkyl peroxides such as di-tert-butyl peroxide, dicumyl peroxide; alkyl peroxyesters such as tert-butyl peroxyacetate and tert-butyl peroxypivalate; azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile] and 4,4'-azobis(4-cyanopentanoic acid); and the like.

According to any of the above-mentioned polymerization methods, there is a case that an acidic compound such as hydrogen fluoride or hydrogen chloride is released from the monomers or the polymers during the polymerization to acidify the polymerization system, resulting in gellation of the polymer. Therefore, the released acidic compound such as hydrogen fluoride or hydrogen chloride may be neutralized by adding inorganic salts such as sodium hydrogencarbonate, sodium carbonate, potassium hydrogencarbonate, potassium carbonate, sodium phosphate, methal oxide and hydrotalcite; organic amines such as diethyl amine, dibutyl amine and triethyl amine; and basic anion exchange resin.

The fluorine-containing copolymer of the present invention is excellent in various properties as explained above, and can be applied to various uses in various manners. For example, there may be utilized in the manner of solution type paints prepared by dissolving in an organic solvent, aqueous dispersion type compositions prepared by dispersing in an aqueous medium, powder type compositions prepared by pulverizing, and non-aqueous dispersion type composition, and curing compositions prepared by blending a curing agent therewith.

As mentioned above, the restriction against the kinds and conditions of solvents to be usable to the copolymer of the present invention can be largely relaxed. Organic solvents suitable to the copolymer of the invention are, for instance, esters such as ethyl acetate, butyl acetate, isopropyl acetate, isobutyl acetate, cellosolve acetate, propylene glycol methyl ether acetate; ketones such as acetone, methyl ethyl ketone, methyl isobutyl ketone and cyclohexanone; cyclic ethers such as tetrahydrofuran and dioxane; amides such as N,N-dimethylformamide and N,N-dimethylacetamide; aromatic hydrocarbons such as toluene and xylene; alcohols such as propylene glycol methyl ether; hydrocarbons such as hexane and heptane; and a mixture thereof. The concentration of the copolymer is 5 to 95% by weight, preferably 10 to 70% by weight.

When preparing the aqueous dispersion type composition, the copolymer may be dispersed in a solvent such as water or a mixed solvent of water and a hydrophilic solvent, if necessary, with an emulsifying agent at a concentration of 10 to 80% by weight. Examples of the hydrophilic solvent are, for instance, alcohols such as methyl alcohol, ethyl alcohol, isopropyl alcohol, n-butyl alcohol, isobutyl alcohol, tert-butyl alcohol, sec-butyl alcohol, tert-amyl alcohol, 3-pentanol, octyl alcohol and 3-methyl-3-methoxybutyl alcohol; ether alcohols such as methyl cellosolve, cellosolve, isopropyl cellosolve, butyl cellosolve and diethylene glycol monobutyl ether; ketones such as acetone, methyl ethyl ketone and methyl isobutyl ketone; esters such as ethyl acetate, cellosolve acetate, n-butyl acetate, isobutyl acetate, methyl cellosolve acetate and carbitol acetate; and the like. Examples of the emulsifier are, for instance, anionic surface active agents such as alkylbenzenesulfonate, alkylnaphthalenesufonate, higher fatty acid salt, salt of alkyl phosphate, salt of alkylether phosphate, salt of phosphate and perfluoroalkylfatty acid salt; nonionic surface active agents such as alkylphenol ethylenoxide addition product, higher alcohol ethyleneoxide addition product and ethyleneoxide-propyleneoxide block-copolymer; and the like. Further, there may be employed, as a protective colloid, various water-soluble polymers such as polyvinyl alcohol, polyvinyl pyrrolidone, hydroxyethyl cellulose, methyl cellulose, hydroxypropyl cellulose, poly(sodium acrylate), and ethylene-maleic anhydride copolymer.

To the aqueous dispersion may be added, in view of workability or processability, dispersion stabilizers such as sodium tripolyphosphate, sodium hexamethaphosphate and poly(sodium acrylate); wetting agents such as the above-mentioned nonionic surface active agents; thickening agents such as the above-mentioned water-soluble polymers for protective colloids; defoaming agents such as silicone oil and mineral oil; plasticizers or film forming auxiliaries such as dibutyl phthalate, dioctyl phthalate, butylcarbitol phthalate and methyl cellosolve; coloring agents for emulsion paints such as titanium oxide; fillers such as calcium carbonate, clay and silica; usual antiseptics; usual mould protecting agents; and pH controlling agents. Further, there may be added emulsions of homo- or co-polymers of acrylic acid, acrylate, vinyl acetate, vinyl chloride, acrylate-styrene, vinyl chloride-vinyl acetate, ethylene-vinyl acetate, ethylene-vinyl acetate-vinyl chloride, and the like.

The aqueous dispersion type composition is applicable to the uses for curable compositions at room or an elevated temperature.

When preparing the powder type composition, the copolymer is pulverized in usual manner by using, for example, impact hammer mill, to an average particle size of 0.05 to 10 $\mu$m. The powder type composition is applicable to the use for thermosetting type powder paints and the like.

The copolymer of the invention may be blended with other resins. Non-restricted examples of the other compatible resins are, for instance, (meth)acrylic resins which may contain styrene, polyester resins, alkyd resins, melamin-formaldehyde resins, polyisocyanate resins, epoxy resins, vinyl chloride resins (e.g. a vinyl chloride-vinyl acetate copolymer), ketone resins, petroleum resins, chlorinated resins of polyolefins such as polyethylene and polypropylene, inorganic resins such as silica gel and silicic acid, various fluoro resins other than the fluorine-containing copolymer of the present invention (e.g. homopolymer or copolymer of tetrafluoroethylene or chlorotrifluoroethylene), a mixture of two or more kinds of those resins.

Among the above compatible resins, the mixtures with the acrylic polymers which have excellent compatibility are particularly preferable, which endow the obtained coating films with excellent glossiness, hardness and good appearance of finished products.

As the acrylic polymers, there can be employed acrylic polymers which have hitherto been used in the field of coatings or paints. Particularly, it is preferable to use (i) a homopolymer or copolymer of an alkyl ester (alkyl group having 1 to 10 carbon atoms) of a (meth)acrylic acid, and (ii) a copolymer of a (meth)acrylate having a curable functional group in the side chain and/or at the terminals of the main chain.

Examples of the acrylic polymer (i) are, for instance, a homopolymer or copolymer of methyl (meth)acrylate, ethyl (meth)acrylate, butyl (meth)acrylate, cyclohexyl (meth)acrylate or the like, and a copolymer of the monomer with a copolymerizable ethylenic unsaturated monomer. Examples of the copolymerizable, ethylenically unsaturated monomers are, for instance, (meth)acrylates, acrylates having fluorine atom or chlorine atom at the $\alpha$-position, fluoroalkyl (meth)acrylates wherein the alkyl group is substituted by fluorine atom, vinyl ethers, vinyl esters, aromatic vinyl monomers (e.g. styrene), ethylene, propylene, isobutyrene, vinyl chloride, vinylidene chloride, diesters of fumaric acid, diesters of maleic acid, (meth)acrylonitrile, and the like. Examples of the acrylic polymers (i) on the market are, for instance, "HITALOID 1005", "HITALOID 1206", "HITALOID 2230-60", "HITALOID 4001" and "HITALOID 1628A" which are commercially available from Hitachi Chemical Co., Ltd.; "DIANAL LR-1065" and "DIANAL LR-90" which are commercially available from Mitsubishi Rayon Co., Ltd.; "PARAROID B-44", "PARALOID A-21" and "PARALOID B-82" which are commercially available from Rohm & Hass Co., "ELVACITE 2000" commercially available from Du Pont.

As the acrylic polymers (ii), there is used a copolymer of a monomer having a curable functional group such as hydroxyl group, carboxyl group, epoxy group or amino group with a (meth)acrylate, or the like. Non-restrictive examples of the monomers having the functional group are, for instance, hydroxyethyl (meth)acrylate, 2-hydroxypropyl (meth)acrylate, 2-hydroxyethyl vinyl ether, (meth)acrylic acid, glycidyl (meth)acrylate, 2-aminoethyl (meth)acrylate, 2-aminopropyl (meth)acrylate; and the like. As the acrylic polymers (ii), there are used copolymers of the above-mentioned monomer having the functional group and the above-mentioned lower alkyl ester of (meth)acrylic acid, or copolymers of the monomer having the functional group and the above-mentioned ethylenically unsaturated monomer, and the like. The acrylic polymers (ii) are not limited thereto. Examples of the acrylic polymers (ii) on the market are, for instance, "HITALOID 3004", "HITALOID 3018" and "HITALOID 3046C" which are commercially available from Hitachi Chemical Co., Ltd.; "Acrydic A810-45", "Acrydic A814" and "Acrydic 47-540" which are commercially available from Dainippon Ink Chemical Co., Ltd.; "DIANAL LR-620", "DIANAL SS-1084" and "DIANAL SS-792" which are commercially available from Mitsubishi Rayon Co., LTD., "OLESTER Q166" and "OLESTER Q185" which are commercially available from Mitsui Toatsu Chemicals Inc.; and the like.

A number average molecular weight of the acrylic polymers measured by GPC is from 1,000 to 200,000, preferably from 5,000 to 100,000. When the Mn of the acrylic polymers is larger, it tends to lower the solvent solubility. When the Mn is smaller it tends to lower the weatherability.

The mixture of the copolymer of the present invention and the acrylic polymer can be used in the manner of the above organic solvent type composition, the aqueous dispersion type composition, the powder type composition, the non-aqueous dispersion type composition.

The copolymer of the present invention can provide a curable composition by adding a curing agent. As the curing agent, there are used compounds which can crosslinked by reacting with the curable functional group of the copolymer, e.g. isocyanates, amino resins, acid anhydrides, polysilane compounds, polyepoxy compounds, isocyanate-containing silane compounds, and the like.

Examples of the isocyanates are, for instance, 2,4-tolylene diisocyanate, diphenylmethane-4,4'-diisocyanate, xylylenediisocyanate, isophorone diisocyanate, lysine methyl ester diisocyanate, methyl cyclohexyl diisocyanate, trimethyl hexamethylene diisocyanate, hexamethylene diisocyanate, n-pentane-1,4-diisocyanate, a trimer type thereof, an aduct type thereof, a buret thereof, a polymer thereof having two or more isocyanate groups, a blocked type isocianate, and the like. The isocyanates are not limited thereto.

Examples of the amino resins are, for instance, urea resins, melamine resins, benzoguanamine resins, glycoluryl resins, methylolmelamine resins prepared by methylolizing melamine, alkyletherified melamine resins prepared by etherifying the methylolmelamine resin with an alcohol such as methanol, ethanol or butanol, and the like. The amino resins are not limited thereto.

Examples of the acid anhydrides are, for instance, phthalic anhydride, pyromellitic anhydride, mellitic anhydride, succinic anhydride, and the like. The acid anhydrides are not limited thereto.

As the polysilane compounds, there are used compounds having two or more groups selected from hydrolyzable groups which directly bond to silicon atom and SiOH, or condensation products thereof, for example, compounds described in Japanese Unexamined Patent Publication No. 232250/1990 and No. 232251/1990. Examples of the polysilane compounds are, for instance, dimethyldimethoxysilane, dibutyldimethoxysilane, diisopropyldipropoxysilane, diphenyldibutoxysilane, diphenylethoxysilane, diethyldisilanol, dihexyldisilanolmethyltrimethoxysilane, methyltriethoxysilane, ethyltriethoxysilane, propyltrimethoxysilane, phenyltriethoxysilane, phenyltributyloxysilane, hexyltriacetoxysilane, methyltrisilanol, phenyltrisilanol, tetramethoxysilane, tetraethoxysilane, tetrapropoxysilane, tetraacetoxysilane, diisopropoxydivaleroxysilane, tetrasilanol, and the like.

As the polyepoxy compounds and the isocyanate-containing silan compounds, there are used the compounds, for example, described in Japanese Unexamined Patent Publication No. 232250/1990 and No. 232251/1991. Preferred examples are, for instance,

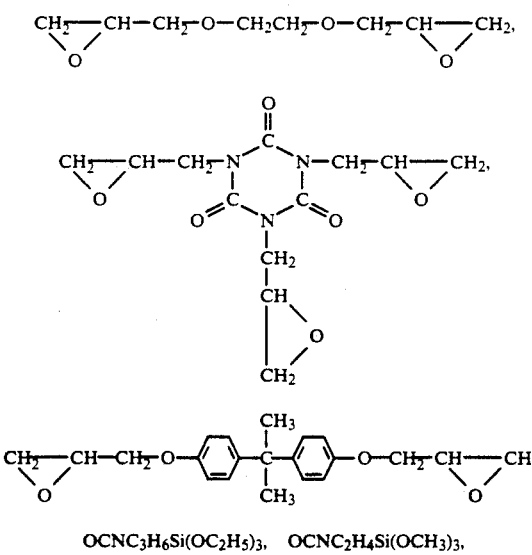

OCNC$_3$H$_6$Si(OC$_2$H$_5$)$_3$, OCNC$_2$H$_4$Si(OCH$_3$)$_3$, and the like.

An amount of the curing agent is, from 0.1 to 5 equivalents per equivalent of the chemically curable functional group in the fluorine-containing copolymer, preferably from 0.5 to 1.5 equivalents. The composition can be usually cured at 0° to 200° C. for several minutes to about ten days.

The curable composition of the present invention may contain various additives such as a curing accelerator, a pigment, a pigment dispersing agent, a levelling agent, an antifoaming agent, an antigelling agent, an ultraviolet absorber and an antioxidant.

Examples of the curing accelerator are, for instance, an organotin compound, an acidic phosphate, a reaction product of the acidic phosphate and an amine, a saturated or unsaturated polyvalent carboxylic acid or anhydride, an organic titanate compound, an amine compound, lead octylate, and the like.

Examples of the organotin compound are, for instance, dibutyl tin dilaurate, dibutyl tin maleate, dioctyl tin maleate, dibutyl tin diacetate, dibutyl tin phthalate, tin octylate, tin naphthenate, dibutyl tin methoxide, and the like.

The acidic phosphates as mentioned above are phosphoric ester containing a moiety:

for instance, organic acidic phosphoric esters having the formula:

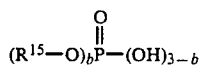

wherein b is 1 or 2 and R$^{15}$ is an organic residue, and the like. Concretely, there are exemplified, for instance,

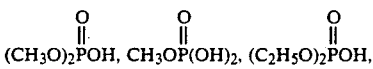

Examples of the organic titanate compound are, for instance, titanic acid esters such as tetrabutyl titanate, tetraisopropyl titanate and triethanolamine titanate, and the like.

Examples of the amino compound are, for instance, an amino compound such as butyl amine, octyl amine, dibutyl amine, monoethanol amine, diethanol amine, triethanol amine, diethylene triamine, triethylene tetramine, oleyl amine, cyclohexyl amine, benzyl amine, diethylaminopropyl amine, xylylene diamine, triethylene diamine, guanidine, diphenyl guanidine, 2,4,6-tris(-dimethylaminomethyl)phenol, morpholine, N-methyl morpholine or 1,8-diazabicyclo(5,4,0)undec-7-ene (DBU); its salt with a carboxylic acid; a polyamide resin having a low molecular weight prepared from an excess amount of a polyamine and a polybasic acid; a reaction product prepared from an excess amount of a polyamine and an epoxy compound, and the like.

The curing accelerator may be used alone or in an admixture thereof.

An amount of the curing accelerator is, preferably from $1.0 \times 10^{-6}$ to $1.0 \times 10^{-2}$ parts by weight based on 100 parts by weight of the copolymer, more preferably from $5.0 \times 10^{-5}$ to $1.0 \times 10^{-3}$ parts by weight.

Nonrestrictive examples of the pigment are, for instance, inorganic pigments such as titanium oxide, calcium carbonate and carbon black; organic pigments such as a phthalocyanine, a quinacridone and an azo pigment. An amount of the pigment is usually up to about 200% by weight based on the copolymer.

The curable composition can be prepared in a form of the above-mentioned organic solvent type composition, the aqueous dispersion type composition, the powder type composition, non-aqueous dispersion type composition.

The curable composition of the present invention is excellent in solvent solubility, and can provide coating films having excellent weatherability, stain resistance, chemical resistance, optical properties, mechanical properties, adhesion to a substrate and heat-yellowing resistance. The composition of the present invention can be applied, as an indoor paint for building materials or interior materials or outdoor materials for buildings, cars, airplanes, ships or rail trains like usual paints, directly to metals, woods, concretes, plastics, and the like, or can be applied to a coating film of an under coat such as a wash primer, an anticorrosive coating, an epoxy coating, an acrylic resin coating or a polyester resin coating. Also, the composition can be used as a sealing material or a film forming agent.

The present invention is more specifically described and explained by means of the following Examples. It is to be understood that the present invention is not limited to the Examples, and various changes and modifications may be made in the invention without departing from the spirit and scope thereof.

EXAMPLE 1

Preparation of copolymer

A 1000 ml stainless steel autoclave was charged with 250 g of butyl acetate, 36.4 g of vinyl pivalate (VPi), 32.5 g of 4-hydroxybutyl vinyl ether (HBVE) and 4.0 g of isopropoxycarbonyl peroxide, and the mixture was cooled to 0° C., then deairated under a reduced pressure. To the mixture were added 47.0 g of isobutylene (IB) and 165.4 g of chlorotrifluoroethylene (CTFE). The mixture was heated to 40° C. with stirring and reacted for 25 hours, and then the reaction was terminated at a time when the inner pressure of the reactor was changed from 4.5 kg/cm$^2$G to 2.4 kg/cm$^2$G (Yield of polymer: 70.3% by weight). The resultant curable fluorine-containing copolymer was a copolymer of 44% by mole of CTFE, 34% by mole of IB, 15% by mole of VPi and 7% by mole of HBVE determined from the results of $^{19}$F-NMR, $^1$H-NMR and elementary analysis. The number average molecular weight (Mn) determined by GPC is $3.5 \times 10^4$, and the glass transition temperature (Tg) was 25.4° C. determined by DSC.

The solubility, compatibility and heat-yellowing resistance of the copolymer and also the transparency of the copolymer film were measured in the following methods. The results are shown in Table 1.

Solubility

Several pieces of the copolymer are mixed with butyl acetate and stirred well (if necessary, with heating). After allowing to stand at room temperature, the state of solution is observed with naked eyes.
A: Completely dissolved
B: Partially dissolved
C: Insoluble Compatibility The copolymer is dissolved to butyl acetate so that a solid content is 33% by weight, and thereto is added TAKENATE D140N (isocyanate curing agent from Tadeka Chemical Industries, Ltd.) so that a molar ratio of OH/NCO is 1.1. The resultant composition is applied to a polyethylene terephthalate, and allowed to stand at room temperature. After the solvent is evaporated, the state of the coating film is observed with naked eyes.
A: Transparent (good compatibility)
B: Lightly whitened
C: Opaque (poor compatibility)

Heat-yellowing resistance

A butyl acetate solution of the copolymer (solid content: 30% by weight) is heated at 140° C. for 3 hours under a reduced pressure. After that a degree of coloring (yellowing) is observed with naked eyes.
A: Colorless and transparent
B: Lightly colored
C: Remarkably yellowing Transparency A butyl acetate solution of the copolymer (solid content: 30% by weight) is applied to a polyethylene terephthalate film and allowed to stand at room temperature. After the solvent is evaporated, the state of the coating film is observed with naked eyes.
A: Transparent
B: Hazed a little
C: Opaque Contact angle to water Measured by using a measuring device of CA-A type available from Kyowa Kagaku Kabushiki Kaisha.

Various copolymers were prepared by using monomers shown in Table 1, and were determined their properties. The results are shown in Table 1.

EXAMPLE 2

Preparation of composition

In 20 g of butyl acetate was dissolved 10 g of the copolymer obtained in Example 1, and 3.1 g of TAKENATE D140N (NCO content: 10.6% by weight, available from Takeda Chemical Industries, Ltd.) was added as a curing agent to prepare a curable composition (NCO/ON=1).

The composition was applied to an aluminium plate (JIS H 4000A-1050P AM-712) by spray coating. After allowing to stand for 10 days at room temperature to form a cured coating film, the following film properties were determined. The results are shown in Table 1.

Weatherability

With respect to the coating film, the accelerated weathering test is carried out for 500 hours by using the sunshine weather-ometer dew cycle (one cycle being Light/Dew=60 min/60 min) of Suga Shikenki Kabushiki Kaisha. The retention (%) of contact angle to water is calculated.

$$\text{Retention (\%)} = \frac{\text{Contact angle after testing}}{\text{Contact angle before testing}} \times 100$$

Stain resistance

A square (10 mm × 10 mm) is marked on the coating film by using a red marking pen (commercially available under the trademark "Sakura Pen Tach"). After allowing to stand for 24 hours, the ink is rubbed with ethanol and the state of remaining the ink is observed with naked eyes. Evaluation is as follows:
A: Completely removed
B: Slightly remained
C: Remained in some extent
D: Remarkably remained

Adhesion

The adhesion-peeling off test is conducted according to JIS K 5400.

Composite stain resistance

To the coating film is applied a composition of leaf mold, cement, kaolin, silica gel, carbon black, iron oxide and fluidized paraffin (38/17/17/17/1.75/0.5/8.75 by weight), and then an accelerated weathering test is carried out with EYE SUPER UV tester (a weathering tester commercially available from The Iwasaki Electric Co., Ltd. (one cycle: Light/Dew=11 hr/11 hr, temperature of black panel=63° C.). After two cycles, the surface of the film is washed with water by using a brush, and then a retention (%) of contact angle to water is determined.

The symbols of the monomers in Tables 1 are as follows:

CTFE: Chlorotrifluoroethylene
TFE: Tetrafluoroethylene
HEP: Hexafluoropropylene
IB: Isobutylene
MP: 2-Methyl-1-pentene
E: Ethylene
VCl: Vinyl Chloride
HEAE: 2-Hydroxyethyl allyl ether
HBVE: 4-Hydroxybutyl vinyl ether
VAc: Vinyl acetate
VPi: Vinyl pivalate
VV-9: Vinyl Versatate ®
(VeoVa-9 from Shell Chemicals)
VBz: Vinyl benzoate
DEM: Diethyl maleate
DBM: Dibutyl maleate
DEF: Diethyl fumarate
DBF: Dibutyl fumarate
Rf: $CH_2 = CH\,(CF_2)_p\,CF_3$ (p = 1 to 5)
EVE: Ethyl vinyl ether
CHVE: Cyclohexyl vinyl ether

TABLE 1

| | Experimental No. | | | | | | | | | |
|---|---|---|---|---|---|---|---|---|---|---|
| | 1 | 2 | 3 | 4 | 5 | 6 | 7 | 8 | 9 | 10 |
| Structure of copolymer (% by mole) | | | | | | | | | | |
| Structural units (1) | | | | | | | | | | |
| CTFE | 44 | 46 | — | 44 | — | 40 | — | 39 | 40 | — |
| TFE | — | — | 45 | — | 45 | — | 40 | — | — | — |
| HFP | — | — | — | — | — | — | — | — | — | 43 |
| Structural units (2) | | | | | | | | | | |
| IB | 34 | 35 | 33 | 35 | 30 | 42 | 37 | 44 | 42 | 32 |
| MP | — | — | — | — | — | — | — | — | — | — |
| Structural units (3) | | | | | | | | | | |
| HEAE | — | 6 | — | — | — | — | — | — | 7 | — |
| HBVE | 7 | — | 8 | 7 | 9 | 7 | 8 | 8 | — | 9 |
| Structural units (4) | | | | | | | | | | |
| VAc | — | 13 | — | — | — | — | — | — | — | — |
| VPi | 15 | — | 14 | — | — | — | — | — | — | — |
| VV-9 | — | — | — | 14 | — | — | 10 | — | — | — |
| VBz | — | — | — | — | 16 | — | — | — | — | 16 |
| DEM | — | — | — | — | — | 11 | — | — | — | — |
| DBM | — | — | — | — | — | — | 5 | — | — | — |
| DEF | — | — | — | — | — | — | — | 9 | — | — |
| DBF | — | — | — | — | — | — | — | — | 11 | — |
| Structural units (5) | | | | | | | | | | |
| Rf | — | — | — | — | — | — | — | — | — | — |
| E | — | — | — | — | — | — | — | — | — | — |
| VCl | — | — | — | — | — | — | — | — | — | — |
| EVE | — | — | — | — | — | — | — | — | — | — |
| CHUE | — | — | — | — | — | — | — | — | — | — |
| Copolymer properties | | | | | | | | | | |
| Mn ($\times 10^4$) | 3.5 | 3.4 | 4.1 | 2.5 | 3.3 | 3.6 | 4.0 | 3.2 | 2.7 | 1.8 |
| Tg (°C.) | 25.4 | 20.4 | 25.1 | 24.3 | 30.5 | 31.5 | 27.5 | 30.1 | 34.3 | 23.0 |
| Solubility | A | A | A | A | A | A | A | A | A | A |
| Compatibility | A | A | A | A | A | A | A | A | A | A |
| Heat-yellowing resistance | A | A | A | A | A | A | A | A | A | A |
| Transparency | A | A | A | A | A | A | A | A | A | A |
| Film properties | | | | | | | | | | |
| Weatherability (%) | 93 | 95 | 94 | 98 | 96 | 93 | 95 | 95 | 94 | 98 |
| Stain resistance | A | A | A | A | A | A | A | A | A | A |
| Adhesion | 100/100 | 100/100 | 100/100 | 100/100 | 100/100 | 100/100 | 100/100 | 100/100 | 100/100 | 100/100 |
| Composite stain resistance (%) | 92 | 90 | 89 | 90 | 94 | 90 | 84 | 88 | 89 | 95 |
| Contact angle to water | 95 | 93 | 96 | 94 | 95 | 96 | 95 | 97 | 93 | 94 |

| | Experimental No. | | | | | | |
|---|---|---|---|---|---|---|---|
| | 11 | 12 | 13 | 14 | 15 | 16 | 17 |
| Structure of copolymer | | | | | | | |

TABLE 1-continued

| (% by mole) | | | | | | | |
|---|---|---|---|---|---|---|---|
| Structural units (1) | | | | | | | |
| CTFE | — | — | 30 | 50 | — | 45 | — |
| TFE | 44 | 45 | — | — | 48 | — | 48 |
| HFP | — | — | — | — | — | — | — |
| Structural units (2) | | | | | | | |
| IB | — | 27 | 17 | — | — | — | 43 |
| MP | 32 | — | — | — | — | — | — |
| Structural units (3) | | | | | | | |
| HEAE | — | — | — | — | — | — | — |
| HBVE | 10 | 10 | 14 | 10 | 7 | 10 | 5 |
| Structural units (4) | | | | | | | |
| VAc | — | — | — | — | 8 | — | — |
| VPi | 14 | 8 | — | — | — | 12 | 4 |
| VV-9 | — | — | 39 | — | — | — | — |
| VBz | — | 9 | — | — | — | — | — |
| DEM | — | — | — | — | — | — | — |
| DBM | — | — | — | — | — | — | — |
| DEF | — | — | — | — | — | — | — |
| DBF | — | — | — | — | — | — | — |
| Structural units (5) | | | | | | | |
| Rf | — | 1 | — | — | — | — | — |
| E | — | — | — | — | 37 | — | — |
| VCl | — | — | — | — | — | 33 | — |
| EVE | — | — | — | 25 | — | — | — |
| CHUE | — | — | — | 15 | — | — | — |
| Copolymer properties | | | | | | | |
| Mn ($\times 10^4$) | 2.7 | 2.0 | 3.3 | 2.6 | — | 2.5 | — |
| Tg (°C.) | 20.1 | 23.4 | 34.8 | 20.0 | — | 28.4 | — |
| Solubility | A | A | A | A | C | A | C |
| Compatibility | A | A | A | A | — | A | — |
| Heat-yellowing resistance | A | A | B | B | — | C | — |
| Transparency | A | A | A | A | — | — | — |
| Film properties | | | | | | | |
| Weatherability (%) | 93 | 98 | 71 | 45 | — | 37 | — |
| Stain resistance | A | A | B | B | — | C | — |
| Adhesion | 100/100 | 100/100 | 100/100 | 100/100 | — | 100/100 | — |
| Composite stain resistance (%) | 90 | 99 | 75 | 54 | — | 48 | — |
| Contact angle to water | 94 | 105 | 85 | 87 | — | 82 | — |

EXAMPLE 3

A fluorine-containing copolymer was prepared by using the monomers shown in Table 2 in the same manner as in Example 1. The number average molecular weight, glass transition temperature, heat-yellowing resistance and compatibility with an acrylic polymer of the obtained copolymer were determined. The results are shown in Table 2.

The compatibility with an acrylic polymer was determined in the following manner.

The copolymer and an acrylic polymer is mixed in the same weight, and dissolved in a solvent to prepare a solution (solid content: 30% by weight). The solution is applied to a polyethylene terephthalate film, and allowed to stand at room temperature. After the solvent is evaporated, the state of the coating film is observed with naked eyes.

A: Transparent (good compatibility)
B: Lightly whitened
C: Opaque (poor compatibility)

The procedures of Example 2 were repeated except that a mixture of 8 g of the obtained copolymer and 2 g of the acrylic polymer (DIANAL LR-620 or DIANAL SS-792 of Mitsubishi Rayon CO., Ltd.) to prepare a curable composition, and then a cured coating film was formed in the same manner as in Example 2.

The weatherability, stain resistance, composite stain resistance and adhesion to an acrylate resin of the coating film were determined.

The results are shown in Table 2, in which VtBz represents vinyl para-tert-butylbenzoate.

The adhesion to an acrylate resin was determined by the adhesion-peeling off test against a commercially available acrylate resin plate.

TABLE 2

| | Experimental No. | | | | | | | | |
|---|---|---|---|---|---|---|---|---|---|
| | 18 | 19 | 20 | 21 | 22 | 23 | 24 | 25 | 26 |
| Structure of copolymer (% by mole) | | | | | | | | | |
| Structural units (1) | | | | | | | | | |
| CTFE | 45 | 44 | 45 | — | — | — | 44 | 45 | 43 |
| TFE | — | — | — | 44 | 42 | 43 | — | — | — |
| Structural units (2) | | | | | | | | | |

TABLE 2-continued

| | Experimental No. | | | | | | | | |
|---|---|---|---|---|---|---|---|---|---|
| | 18 | 19 | 20 | 21 | 22 | 23 | 24 | 25 | 26 |
| IB | 22 | 29 | 25 | 27 | 30 | 26 | 30 | 25 | — |
| MP | — | — | — | — | — | — | — | — | 26 |
| Structural units (3) | | | | | | | | | |
| HBVE | 14 | 10 | 15 | 9 | 8 | 14 | 11 | 14 | — |
| HEAE | — | — | — | — | — | — | — | — | 13 |
| Structural units (4) | | | | | | | | | |
| VAc | 19 | — | — | — | — | — | — | — | — |
| VPi | — | 17 | — | 10 | — | 10 | — | 15 | 18 |
| VV-9 | — | — | 15 | — | — | — | — | — | — |
| VBz | — | — | — | 10 | — | — | 10 | — | — |
| VtBz | — | — | — | — | 20 | — | — | — | — |
| DEM | — | — | — | — | — | 7 | — | — | — |
| DEF | — | — | — | — | — | — | 5 | — | — |
| Structural units (5) | | | | | | | | | |
| Rf | — | — | — | — | — | — | — | 1 | — |
| Acrylic polymer | LR-620 | LR-620 | LR-620 | SS-792 | SS-792 | SS-792 | LR-620 | LR-620 | LR-620 |
| Copolymer properties | | | | | | | | | |
| Mn ($\times 10^4$) | 2.1 | 2.5 | 1.5 | 1.4 | 2.8 | 2.1 | 2.5 | 2.4 | 2.6 |
| Tg (°C.) | 20.0 | 24.3 | 15.4 | 26.2 | 24.4 | 27.1 | 26.8 | 22.1 | 21.4 |
| Compatibility with acrylic polymer | A | A | A | A | A | A | A | A | A |
| Heat-yellowing resistance | A | A | A | A | A | A | A | A | A |
| Film properties | | | | | | | | | |
| Weatherability (%) | 91 | 92 | 94 | 90 | 92 | 93 | 94 | 93 | 94 |
| Stain resistance | A | A | A | A | A | A | A | A | A |
| Composite stain resistance (%) | 90 | 89 | 92 | 89 | 91 | 90 | 90 | 91 | 92 |
| Adhesion to acrylate resin | 100/100 | 100/100 | 100/100 | 100/100 | 100/100 | 100/100 | 100/100 | 100/100 | 100/100 |

EXAMPLE 4

Preparation of copolymer

A 1000 ml stainless steel autoclave was charged with 250 g of butyl acetate, 36.4 g of vinyl pivalate (VPi), 32.5 g of 4-hydroxybutyl vinyl ether (HBVE), 1.3 g of vinylacetic acid (VA) and 6.0 g of 2,2'-azobis(2,4-dimethylvaleronitrile), and the mixture was cooled to 0° C., then deairated under a reduced pressure. To the mixture were added 38.3 g of isobutylene (IB) and 142.0 g of tetrafluoroethylene (TFE). The mixture was heated to 50° C. with stirring and reacted for 10 hours, and then the reaction was terminated at a time when the inner pressure of the reactor was changed from 17.5 kg/cm$^2$G to 9.5 kg/cm$^2$G (Yield of polymer: 60.4% by weight). The resultant curable fluorine-containing copolymer was a copolymer of 44% by mole of TFE, 34% by mole of IB, 15% by mole of VPi, 9% by mole of HBVE and 1% by mole of VA determined from the results of $^{19}$F-NMR, $^1$H-NMR and elementary analysis. The number average molecular weight (Mn) determined by GPC is $3.4 \times 10^4$, and the glass transitin temperature (Tg) was 24.5° C. determined by DSC.

The solubility, compatibility and heat-yellowing resistance of the copolymer and also the transparency of the copolymer film were measured in the same manner as in Example 1. Also the pigment dispersibility to the copolymer solution was determined in the following manner. The results are shown in Table 3.

Pigment dispersibility

A 225 ml of mayonnaise glass bottle is charged with 20 g of the copolymer, 5 g of phthalocyanine blue, 75 g of butyl acetate and 100 g of glass beads. The mixture is shaken for 3 hours with a paint phaker to obtain a pasty mixture. The mixture is applied to a glass plate with an applicator, and then a pigment dispersibility to the copolymer solution is observed with naked eyes.

A: High gloss and clear bule
B: Gloss and slightly whitened blue
C: Dull-down and whitened blue Various copolymers were prepared by using the monomers shown in Table 3 in the same manner as above, and the properties thereof were determined. The results are shown in Table 3.

EXAMPLE 5

Preparation of composition

In 20 g of butyl acetate was dissolved 10 g of the copolymer obtained in Example 4, and 3.9 g of TAKENATE D140N was added thereto as a curing agent to prepare a curable composition.

The composition was applied to an aluminium plate (JIS H 4000A-1050P AM-712) by spray coating. After allowing to stand for 10 days at room temperature to form a cured coating film, the weatherability, stain resistance, adhesion and composite stain resistance of the coating film were determined in the same manner as in Example 2. The results are shown in Table 3.

In Table 3, the symbols of the monomer other than Tables 1 and 2 are as follows:

VV-10: Vinyl Versatate ®
(VeoVa-10 from Shell Chemicals)
VA: Vinylacetic acid
CA: Crotonic acid

TABLE 3

| | Experimental No. | | | | | | | | | | |
|---|---|---|---|---|---|---|---|---|---|---|---|
| | 27 | 28 | 29 | 30 | 31 | 32 | 33 | 34 | 35 | 36 | 37 |
| Structure of copolymer (% by mole) | | | | | | | | | | | |
| Structural units (1) | | | | | | | | | | | |
| TFE | 44 | 43 | 42 | 41 | 45 | 43 | 41 | 41 | 39 | 44 | — |
| CTFE | — | — | — | — | — | — | — | — | — | — | 40 |
| Structural units (2) | | | | | | | | | | | |
| IB | 31 | 34 | 32 | 34 | 29 | 26 | 28 | 35 | 40 | — | — |
| MP | — | — | — | — | — | — | — | — | — | 31 | — |
| Structural units (3) | | | | | | | | | | | |
| HBVE | 9 | — | 10 | 9 | 10 | 10 | 20 | 10 | 10 | 10 | — |
| HEAE | — | 9 | — | — | — | — | — | — | — | — | — |
| Structural units (4) | | | | | | | | | | | |
| VAc | — | 13 | — | — | — | — | — | — | — | — | 41 |
| VPi | 15 | — | 10 | — | — | — | — | — | — | 14 | — |
| VV-9 | — | — | — | 15 | 5 | — | — | — | — | — | — |
| VV-10 | — | — | — | — | — | 10 | — | — | — | — | — |
| VBz | — | — | 5 | — | 10 | — | — | — | — | — | — |
| VtBz | — | — | — | — | — | 10 | 10 | — | — | — | — |
| DEM | — | — | — | — | — | — | — | 13 | — | — | — |
| DEF | — | — | — | — | — | — | — | — | 10 | — | — |
| Structural units (5) | | | | | | | | | | | |
| E | — | — | — | — | — | — | — | — | — | — | 18 |
| VCl | — | — | — | — | — | — | — | — | — | — | — |
| EVE | — | — | — | — | — | — | — | — | — | — | — |
| CHVE | — | — | — | — | — | — | — | — | — | — | — |
| Structural units (6) | | | | | | | | | | | |
| VA | 1 | 1 | — | — | — | — | — | — | — | 1 | — |
| CA | — | — | 1 | 1 | 1 | 1 | 1 | 1 | 1 | — | 1 |
| Copolymer properties | | | | | | | | | | | |
| Mn ($\times 10^4$) | 3.4 | 3.3 | 3.8 | 2.1 | 2.2 | 2.3 | 2.5 | 3.5 | 3.2 | 2.1 | — |
| Tg (°C.) | 24.5 | 21.0 | 25.3 | 20.1 | 21.3 | 23.4 | 10.1 | 30.4 | 31.7 | 18.7 | — |
| Solubility | A | A | A | A | A | A | A | A | A | A | A |
| Compatibility | A | A | A | A | A | A | A | A | A | A | A |
| Heat-yellowing resistance | A | A | A | A | A | A | A | A | A | A | C |
| Transparency | A | A | A | A | A | A | A | A | A | A | A |
| Pigment dispersibility | A | A | A | A | A | A | A | A | A | A | A |
| Film properties | | | | | | | | | | | |
| Weatherability (%) | 94 | 96 | 94 | 98 | 95 | 95 | 94 | 96 | 98 | 94 | 75 |
| Stain resistance | A | A | A | A | A | A | A | A | A | A | B |
| Adhesion | 100/100 | 100/100 | 100/100 | 100/100 | 100/100 | 100/100 | 100/100 | 100/100 | 100/100 | 100/100 | 100/100 |
| Composite stain resistance (%) | 91 | 93 | 93 | 92 | 93 | 91 | 95 | 90 | 89 | 95 | 47 |

EXAMPLE 6

A fluorine-containing copolymer was prepared by using the monomers shown in Table 4 in the same manner as in Examples 4. The number average molecular weight, compatibility with an acrylic polymer, pigment dispersibility and heat-yellowing resistance were determined in the same manner as in Examples 2 and 3. The results are shown in Table 4.

A curable composition was prepared by dissolving 10 g of the copolymer obtained above (in Experimental Nos. 45 and 46, the mixture of 8 g of the copolymer and 2 g of the acrylic polymer (DIANAL SS-1084)) to 10 g of xylene, adding thereto 2 g of Cymel 303 (melamin resin from Mitsui Cyanamide Co., Ltd.), 0.06 g of an UV absorber and 0.06 g of a phosphate catalyst. The composition was applied to a SPCC-SD dull stainless steel plate treated with an acrylurethane (white) by spray coating, baked at 140° C. for 30 minutes to form a cured film.

The contact angle to water, weatherability, stain resistance and composite stain resistance of the coating film were determined in the same manner as mentioned above. The scratch resistance and the pencil hardness were also determined in the following manner. The results are shown in Table 4.

Scratch resistance

A coated plate to be tested is placed in a polyethylene container, and water and a polishing powder are added thereto, then the container is sealed tightly. The container is shaken for 30 minutes with a paint shaker, and the coated plate is taken out, then washed with water. A glossiness (20°—20°) of the plate is measured before and after the testing, and a retention (%) of glossiness is calculated.

Pencil hardness

According to JIS K 5400.

REFERENCE EXAMPLE 1

A 1000 ml stainless steel autoclave was charged with 250 g of butyl acetate, 16.9 g of ethyl vinyl ether (EVE), 44.4 g of cyclohexyl vinyl ether (CHVE), 54.5 g of 4-hydroxybutyl vinyl ether (HBVE) and 10.0 g of isopropoxycarbonyl peroxide, and the mixture was cooled to 0° C., then deairated under a reduced pressure. To the mixture was added 150 g of chlorotrifluoroethylene (CTFE), heated to 40° C. with stirring and reacted for 5.5 hours. The reaction was terminated at a time when the inner pressure of reactor was changed from 3.1 kg/cm²G to 1.7 kg/cm²G (Yield of polymer: 51% by weight). The resultant copolymer consisted of 53% by mole of CTFE, 18% by mole of HBVE, 13% by mole of EVE and 16% by mole of CHVE.

The copolymer was modified with 1% by mole of succinic anhydride. The properties of the modified copolymer are shown in Table 4 as Experimental No. 47.

A curable composition was prepared in the same manner as in Example 6 by using the modified copolymer, and a cured coating film was formed in the same manner as in Example 6. The film properties are shown in Table 4 as Experimental No. 47.

REFERENCE EXAMPLE 2

A fluorine-containing copolymer of 53% by mole of CTFE, 20% by mole of HBVE, 12% by mole of EVE and 15% by mole of CHVE was prepared in the same manner as in Reference Example 1. The copolymer was modified with 1% by mole of succinic anhydride. The properties of the modified fluorine-containing copolymer and the coating film formed therefrom were determined. The results are shown in Table 4 as Experimental No. 48.

TABLE 4

| | Experimental No. | | | | | | | | | 47 Ref. Ex. 1 | 48 Ref. Ex. 2 |
|---|---|---|---|---|---|---|---|---|---|---|---|
| | 38 | 39 | 40 | 41 | 42 | 43 | 44 | 45 | 46 | | |
| Structure of copolymer (% by mole) | | | | | | | | | | | |
| Structural units (1) | | | | | | | | | | | |
| TFE | 44 | 43 | 45 | 44 | 43 | 44 | 44 | 43 | 44 | | |
| Structural units (2) | | | | | | | | | | | |
| IB | 19 | 26 | 24 | 21 | 26 | 25 | 25 | 26 | 25 | | |
| Structural units (3) | | | | | | | | | | | |
| HBVE | 21 | 15 | — | 20 | 15 | 15 | 13 | 15 | 15 | | |
| HEAE | — | — | 15 | — | — | — | — | — | — | | |
| Structural units (4) | | | | | | | | | | | |
| VAc | 15 | — | — | — | — | — | — | — | — | | |
| VPi | — | 10 | — | — | — | — | 11 | 10 | 10 | | |
| VV-9 | — | — | 15 | — | — | 10 | — | — | — | | |
| VV-10 | — | — | — | 5 | — | — | — | — | — | | |
| VBz | — | 5 | — | — | — | — | 5 | 5 | — | | |
| VtBz | — | — | — | 9 | 15 | 5 | — | — | 5 | | |
| Rf | — | — | — | — | — | — | 1 | — | — | | |
| Structural units (5) | | | | | | | | | | | |
| VA | 1 | — | 1 | — | 1 | — | — | — | — | | |
| CA | — | 1 | — | 1 | — | 1 | 1 | 1 | 1 | | |
| Copolymer properties | | | | | | | | | | | |
| Mn (×10⁴) | 0.61 | 0.60 | 0.63 | 0.60 | 0.58 | 0.60 | 0.59 | 0.57 | 0.61 | 0.90 | 0.60 |
| Compatibility with acrylic polymer | A | A | A | A | A | A | A | A | A | A | A |
| Pigment dispersibility | A | A | A | A | A | A | A | A | A | B | B |
| Heat-yellowing resistance | A | A | A | A | A | A | A | A | A | B | B |
| Blend of acrylic polymer | none | none | none | none | none | none | none | blended | blended | none | none |
| Film properties | | | | | | | | | | | |
| Contact angle to water | 91 | 92 | 90 | 89 | 91 | 91 | 105 | 90 | 92 | 85 | 83 |
| Weatherability (%) | 95 | 98 | 97 | 98 | 96 | 97 | 98 | 96 | 95 | 58 | 53 |
| Stain resistance | A | A | A | A | A | A | A | A | A | B | B |
| Composite stain resistance (%) | 92 | 93 | 92 | 91 | 90 | 92 | 93 | 93 | 92 | 46 | 50 |
| Scratch resistance (%) | 85 | 88 | 90 | 86 | 91 | 87 | 90 | 92 | 87 | 44 | 60 |
| Pencil hardness | H | H | H | H | H | H | H | 2H | 2H | H | H |

EXAMPLE 7

Preparation of aqueous dispersion type composition

A mixture was prepared from 20 parts by weight of an ethyl acetate solution (solid content: 50% by weight) of the copolymer obtained in Experimental No. 27 (TFE/IB/HBVE/VPi/VA=44/31/9/15/1 by mole) and 90 parts by weight of deionized water, 0.25 part by weight of polyethylene glycol alkylphenyl ether and 0.25 part by weight of polyethylene glycol alkyl ammonium chloride. After the mixture was subjected to ultrasonic treatment at 60° C. for 3 minutes, a silicone defoaming agent was added (10 ppm), then ethyl acetate was distilled off at 30° C. under a reduced pressure. The resultant composition was an emulsified aqueous dispersion, and was stable for one month or more at room temperature.

EXAMPLE 8

Preparation of powder type composition

A mixture was prepared from 60 parts by weight of the copolymer obtained in Experimental No. 38 (TFE-/IB/HBVE/VAc/VA=44/19/21/15/1 by mole) and 40 parts by weight of an acrylic polymer (DIANAL SS-1084 available from Mitsubishi Rayon Co., Ltd.). After the mixture was pulverized with an impact hammer mill, the powdered mixture was mixed with 40.0 parts by weight of a blocked isocyanate (ADUCT B-1530 available from Hüls) and 1.4 parts by weight of a levelling agent (MODAFLOW available from Monsant) in a frustroconical agitation mixer. The obtained mixture was kneaded and extruded from a screw extruder at 80° C., and cooled, followed by pulverized with the impact hammer mill. A powder type composition was obtained by screening the powdered mixture through a 200 mesh screen.

The fluorine-containing copolymer of the present invention comprising the particular structural units is excellent in solvent-solubility, compatibility with curing agents, additives and other polymers, pigment dispersibility, curing reactivity, dispersibility to water, pot life, film forming ability, coating properties, and the like. The coating film prepared from the copolymer has a high weatherability and is excellent in film properties such as stain resistance, heat-yellowing resistance, dechlorination resistance, optical properties, adhesion to a substrate, mechanical properties, heat resistance, chemical resistance, solvent (gasoline) resistance, water resistance and good appearance of finished products.

What we claim is:

1. A fluorine-containing copolymer having a number average molecular weight of 1000 to 500000, which consists essentially of
   (a) a fluoroolefin structural unit (1) represented by the formula (I):

$$-CF_2-CFX- \quad (I)$$

wherein X is fluorine atom, chlorine atom, hydrogen atom or trifluoromethyl;
   (b) a β-methyl substituted α-olefin structural unit (2) represented by the formula (II):

wherein R is an alkyl group having 1 to 8 carbon atoms;
   (c) a structural unit (3) derived from a monomer having a chemically curable functional group; and
   (d) a structural unit (4) derived from a monomer having ester moieties in the side chains; wherein said copolymer contains the structural unit (1) in an amount of 20 to 60% by mole, the structural unit (2) in an amount of 5 to 45% by mole, the structural unit (3) in an amount of 1 to 45% by mole and the structural unit (4) in an amount of 1 to 45% by mole, provided that the sum of the units (1) and (2) is 40 to 90% by mole.

2. A fluorine-containing copolymer having a number average molecular weight of 1000 to 500000, which consists essentially of
   (a) a fluoroolefin structural unit (1) represented by the formula (I):

$$-CF_2-CFX- \quad (I)$$

wherein X is fluorine atom, chlorine atom, hydrogen atom or trifluoromethyl;
   (b) a β-methyl substitute α-olefin structural unit (2) represented by the formula (II):

wherein R is an alkyl group having 1 to 8 carbon atoms;
   (c) a structural unit (3) derived from a monomer having a chemically curable functional group;
   (d) a structural unit (4) derived from a monomer having ester moieties in the side chains; and
   (e) a structural unit (5) derived from a copolymerizable monomer selected from the group consisting of an alkyl vinyl ether, an aromatic vinyl ether, a fluoroalkyl vinyl ether, a fluoroalkyl ethylene, a $C_{1-18}$ alkyl ether of acrylic acid, a $C_{1-18}$ alkyl ester of methacrylic acid, a $C_{2-18}$ alkoxyalkyl ester of acrylic acid, a $C_{2-18}$ alkoxyalkyl ester of methacrylic acid and a vinyl aromatic compound;
   wherein said copolymer contains the structural unit (1) in an amount of 20 to 60% by mole, the structural unit (2) in an amount of 5 to 45% by mole, the structural unit (3) in an amount of 1 to 45% by mole, the structural unit (4) in an amount of 1 to 45% by mole and the structural unit (5) in an amount of not more than 45% by mole, provided that the sum of the units (1) and (2) is 40 to 90% by mole.

3. A fluorine-containing copolymer having a number average molecular weight of 1000 to 500000, which consists essentially of
   (a) a fluoroolefin structural unit (1a) derived from tetrafluoroethylene,
   (b) a β-methyl substituted α-olefin structural unit (2) represented by the formula (II):

wherein R is an alkyl group having 1 to 8 carbon atoms;
   (c) a structural unit (3) derived from a monomer having a chemically curable functional group;
   (d) a structural unit (4) derived from a monomer having ester moieties in the side chains; and
   (e) a structural unit (6) derived from a monomer having carboxyl groups;
   wherein said copolymer contains the structural unit (1a) in an amount of 20 to 60% by mole, the structural unit (2) in an amount of 5 to 45% by mole, the structural unit (3) in an amount of 1 to 45% by mole, the structural unit (4) in an amount of 1 to 45% by mole and the structural unit (6) in an amount of 0.1 to 25% by mole, provided that the sum of the units (1) and (2) is 40 to 90% by mole.

4. A fluorine-containing copolymer having a number average molecular weight of 1000 to 500000, which consists essentially of
(a) a fluoroolefin structural unit (1a) derived from tetrafluoroethylene,
(b) a β-methyl substituted α-olefin structural unit (2) represented by the formula (II):

$$-CH_2-\underset{R}{C(CH_3)}- \qquad (II)$$

wherein R is an alkyl group having 1 to 8 carbon atoms;
(c) a structural unit (3) derived from a monomer having a chemically curable functional group;
(d) a structural unit (4) derived from a monomer having ester moieties in the side chains; and
(e) a structural unit (5) derived from a copolymerizable monomer selected from the group consisting of an alkyl vinyl ether, an aromatic vinyl ether, a fluoroalkyl vinyl ether, a fluoroalkylethylene, a $C_{1-18}$ alkyl ester of acrylic acid, a $C_{1-18}$ alkyl ester of methacrylic acid, a $C_{2-18}$ alkoxyalkyl ester of acrylic acid, a $C_{2-18}$ alkoxyalkyl ester of acrylic acid, a $C_{2-18}$ alkoxyalkyl ester of methacrylic acid and a vinyl aromatic compound; and
(f) a structural unit (6) derived from a monomer having carboxyl groups;
wherein said copolymer contains the structural unit (1a) in an amount of 20 to 60% by mole, the structural unit (2) in an amount of 5 to 45% by mole, the structural unit (3) in an amount of 1 to 45% by mole, the structural unit (4) in an amount of 1 to 45% by mole, the structural unit (5) in an amount of not more than 45% by mole and the structural unit (6) in an amount of 0.1 to 15% by mole, provided that the sum of the units (1) and (2) is 40 to 90% by mole.

* * * * *